(12) United States Patent
Raaijmakers et al.

(10) Patent No.: US 12,040,907 B2
(45) Date of Patent: Jul. 16, 2024

(54) ETHERNET OVER BASIC INTERFACE BETWEEN ELECTRIC VEHICLE SUPPLY EQUIPMENT AND ELECTRIC VEHICLES

(71) Applicant: ABB E-mobility B.V., Delft (NL)

(72) Inventors: Stefan Raaijmakers, Delft (NL); Lars Peter Bech, Schiedam (NL); Miguel Rodriguez Escude, Delft (NL)

(73) Assignee: ABB E-mobility B.V., Delft (NL)

(*) Notice: Subject to any disclaimer, the term of this patent is extended or adjusted under 35 U.S.C. 154(b) by 197 days.

(21) Appl. No.: 17/407,196

(22) Filed: Aug. 20, 2021

(65) Prior Publication Data

US 2021/0385095 A1    Dec. 9, 2021

Related U.S. Application Data

(63) Continuation of application No. PCT/EP2020/055163, filed on Feb. 27, 2020.

(60) Provisional application No. 62/811,963, filed on Feb. 28, 2019.

(51) Int. Cl.
| | |
|---|---|
| H04B 3/00 | (2006.01) |
| B60L 53/18 | (2019.01) |
| B60L 53/66 | (2019.01) |
| H02J 7/00 | (2006.01) |
| H04L 12/10 | (2006.01) |

(52) U.S. Cl.
CPC .............. *H04L 12/10* (2013.01); *B60L 53/18* (2019.02); *B60L 53/66* (2019.02); *H02J 7/0045* (2013.01)

(58) Field of Classification Search
CPC .......... H04L 12/10; B60L 53/66; B60L 53/18; H02J 7/0045

USPC .................. 375/257, 219, 295, 316
See application file for complete search history.

(56) References Cited

U.S. PATENT DOCUMENTS

| | | | |
|---|---|---|---|
| 10,926,644 B1* | 2/2021 | Willson | H02J 7/342 |
| 2001/0046224 A1 | 11/2001 | Ryu | |
| 2008/0253392 A1 | 10/2008 | Diab | |
| 2008/0294917 A1 | 11/2008 | Khan et al. | |
| 2012/0166269 A1 | 6/2012 | Payne et al. | |
| 2013/0169220 A1 | 7/2013 | Karner et al. | |

(Continued)

FOREIGN PATENT DOCUMENTS

| | | |
|---|---|---|
| CN | 101933102 A | 12/2010 |
| CN | 202906512 U | 4/2013 |

(Continued)

OTHER PUBLICATIONS

D. Wellisch et al., "Vehicle-to-Grid AC Charging Station: An Approach for Smart Charging Development," IFAC-PapersOnLine, Jan. 2015, pp. 55-60, Elsevier, Amsterdam, Netherlands.

(Continued)

*Primary Examiner* — Zewdu A Kassa
(74) *Attorney, Agent, or Firm* — Leydig, Voit & Mayer, Ltd.

(57) ABSTRACT

A communications interface between electric vehicle supply equipment and an electric vehicle includes: a first connection for connecting to a controller of the electric vehicle supply equipment; a second connection for connecting to a controller of the electric vehicle; and an Ethernet interface coupling the first and second connections for communication between the controller of the electric vehicle supply equipment and the controller of the electric vehicle.

12 Claims, 4 Drawing Sheets

(56) References Cited

U.S. PATENT DOCUMENTS

| | | |
|---|---|---|
| 2013/0169226 A1 | 7/2013 | Read |
| 2015/0076901 A1 | 3/2015 | Panguluri et al. |
| 2015/0291049 A1 | 10/2015 | Deboer, III et al. |
| 2016/0178678 A1* | 6/2016 | Pelletier .................. H02J 3/14 |
| | | 700/291 |
| 2017/0197519 A1 | 7/2017 | Jeong et al. |
| 2017/0272260 A1 | 9/2017 | Han et al. |
| 2017/0368953 A1 | 12/2017 | Zech et al. |
| 2018/0159593 A1 | 6/2018 | Bogdan et al. |

FOREIGN PATENT DOCUMENTS

| | | |
|---|---|---|
| CN | 103887828 A | 6/2014 |
| CN | 104221228 A | 12/2014 |
| CN | 105431320 A | 3/2016 |
| CN | 106170913 A | 11/2016 |
| CN | 107026891 A | 8/2017 |
| CN | 109177766 A | 1/2019 |
| JP | 6-245325 A | 9/1994 |
| JP | 2008-154033 A | 7/2008 |
| JP | 2011-120327 A | 6/2011 |
| JP | 2012-85511 A | 4/2012 |
| JP | 2012-104867 A | 5/2012 |
| JP | 2012-125142 A | 6/2012 |
| JP | 2013-187850 A | 9/2013 |
| JP | 2015-531565 A | 11/2015 |
| JP | 2016-506711 A | 3/2016 |
| JP | 2017-229230 A | 12/2017 |
| WO | WO 2007/140467 A2 | 12/2007 |
| WO | WO 2014/089329 A2 | 6/2014 |
| WO | WO 2017/141329 A1 | 8/2017 |

OTHER PUBLICATIONS

Feng et al., "Application and prospect of Ethernet in substation automation system communication," *Electric Power Automation Equipment*, 26(7): 5 pp. (Jul. 25, 2006), English astract.

Li et al., "Research on the Application of PLC Technology in the Communication System of Electric Vehicle Charging Stations," *Electrotechnical Application*, S2: 84-90 (Dec. 31, 2013), English astract.

Xu et al., "Design of Communication Interface in Multi-function Gateway for Mine," *Coal Mine Machinery*, 33(9): 256-258 (Sep. 15, 2012), English astract.

Wang et al., "Design of Charger Monitoring System for Motor Vehicle Charging Station," *China Computer & Network*, 48-50 (Jun. 12, 2008), English astract.

* cited by examiner

ETHERNET OVER BASIC INTERFACE BETWEEN ELECTRIC VEHICLE SUPPLY EQUIPMENT AND ELECTRIC VEHICLES

CROSS-REFERENCE TO PRIOR APPLICATION

This application is a continuation of International Patent Application No. PCT/EP2020/055163, filed on Feb. 27, 2020, which claims priority to U.S. Provisional Patent Application No. 62/811,963, filed on Feb. 28, 2019. The entire disclosure of both applications is hereby incorporated by reference herein.

FIELD

The present disclosure generally relates to supply equipment for electric vehicles, and more particularly, but not exclusively, to an Ethernet over basic interface between electric vehicle supply equipment and electric vehicles.

BACKGROUND

In AC, alternating current, and DC, direct current, charging, basic interface or signalling is used for communication between an Electric Vehicle, EV, and an Electric Vehicle Supply Station, EVSE. Such basic signalling includes signals that indicate charging conditions, the state of the charge session, presence of the vehicle, etc. Additional to these basic signalling, there is high level communication, HLC, signals between the EV and EVSE. Communication is based on IEC 61851-23 for CHAdeMO, GB/T, and CCS. HLC platforms used by each system are Power Line Communication, PLC, for Combined Charging System, CCS, Controller Area Network, CAN, bus for CHAdeMO and GB/T.

Current HLC protocols are different between for each type of plug. HLC is used to transmit Vehicle-to-Grid, V2G messages that control the status, safety, and conditions of the charge session. PLC is vulnerable to electromagnetic interference, attenuation and other issues that can interrupt the communication between the EV and EVSE, and is limited to 10 m of cable length. CAN is a robust communication protocol used mainly in automotive systems, while limited to 40 m bus length.

However, these communication systems suffer from attenuation, electromagnetic interference, and/or short connection length requirements. Accordingly, there remains a need for further contributions in this area of technology to which the devices, apparatuses, methods, systems, and techniques disclosed herein are directed.

SUMMARY

In an embodiment, the present invention provides a communications interface between electric vehicle supply equipment and an electric vehicle, the communications interface comprising: a first connection configured to connect to a controller of the electric vehicle supply equipment; a second connection configured to connect to a controller of the electric vehicle; and an Ethernet interface coupling the first and second connections for communication between the controller of the electric vehicle supply equipment and the controller of the electric vehicle.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
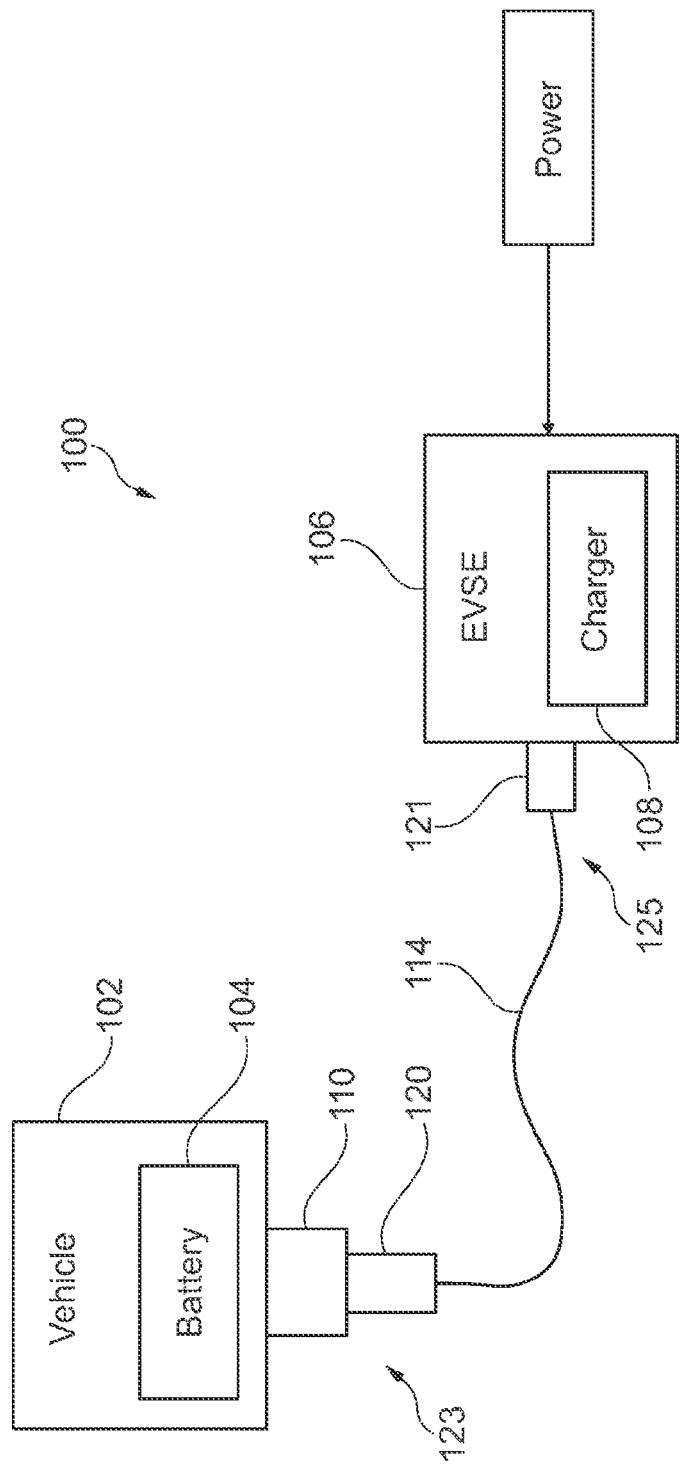
FIG. 1 is a schematic of an example electric vehicle charging system.

In an embodiment, the present invention provides improved communications between an electric vehicle and an electric vehicle supply equipment.

Thus, the object is solved by a communications interface between electric vehicle supply equipment, EVSE, and an electric vehicle, EV, the communications interface comprising:

a first connection for connecting to a controller of the electric vehicle supply equipment;

a second connection for connecting to a controller of the electric vehicle; and an Ethernet interface coupling the first and second connections for communication between the controller of the electric vehicle supply equipment and the controller of the electric vehicle.

It is therefore a key point of the invention to use Ethernet communication in particular for high level communication, HLC, between the EV and EVSE, thereby avoiding different HLC protocols, which are usually different for each type of plug. HLC is probably used to transmit Vehicle-to-Grid, V2G messages that control the status, safety, and conditions as such load balancing of a charge session. Thus, instead of modulating a high-frequency signal over a CP contact, also known as Power Line Communication or PLC, to transfer more complex information, Ethernet is used for such communication, preferably in analogy to standard DIN SPEC 70121 and ISO/IEC 15118-series. Such way the proposed e communications interface enables that charging cables having a length of far more than 10 meters can be used for charging, without risking that communication between the EVSE and EV is deteriorated by electromagnetic interference, EMI, respectively electromagnetic compatibility, EMC, issues and/or crosstalk between different chargers or between multiple outlets in the charger. Charging applications such as charging trucks, busses, ships, trains and/or planes can be easily implemented with the proposed solution. Ethernet is known as robust and suitable for longer distances, and thus guarantees reliable communication between the EVSE and the EV.

The Ethernet interface is preferably provided according to standard IEEE 802.3, thereby allowing communications as per a 1000BASE-T1 or a 100BASE-T1 standard. 1000BASE-T1, preferably as per 802.3bp-2016 standard, allows communications of 1000 Mbps over a single pair of twisted-pair cable over a distance of maximum 40 meters charging cable length. 100BASE-T1, preferably as per 802.3bw-2015 (CL96) standard, allows communications of 100 Mbps over a single pair of twisted-pair cable over a distance of maximum 15 meters charging cable length, in particular between the controllers. Both standards are designated for automotive, IoT or M2M applications such as charging electrical vehicles. Planned standards that require only a single twisted-pair cable are 10BASE-T1S and 10BASE-T1L as per 802.3cg-2019 standard allowing 10 Mbps over a maximum distance of 15 meters respectively 1000 meters. Besides that, other standards can be used for Ethernet over twisted-pair that require two of four twisted-pair cables, for example 100BASE-TX, 1000BASE-T1, 2.5GBASE-T, 5GBASE-T or 10GBASE-T with respective maximum charging cable lengths of 15 meters respectively 100 meters.

The controller of the electric vehicle supply equipment and/or of the electric vehicle is preferably provided as a chip such as a microcontroller and/or as a stand-alone device that interfaces with electrical circuits and/or that manages the operation of the electric vehicle supply equipment and/or of the electric vehicle. The electric vehicle supply equipment, EVSE, also referred to as electric vehicle, EV, charging station, electric recharging point, charging point, charge point, charge post or electronic charging station, ECS. The EVSE is an element in an infrastructure that supplies electric energy for recharging of electric vehicles, including electric cars, neighbourhood electric vehicles and plug-in hybrids, via a charging cable and a charging connector to the EV. EVSEs usually comply with standards for electric vehicle fast charging, such as the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard. The proposed solution can be advantageously used with even higher charging currents such as or more than 500 A, 600 A or 3000 A, voltages such as or higher 1000V, 1500V or 3000V and/or in combination with newer standards not yet defined requiring higher currents.

The EVSE may comprise a converter and preferably a transformer connected to an AC, alternating current, grid for receiving electrical energy, which is transformed and/or converted to DC, direct current, for charging a battery of the electric vehicle connected via a DC bus to the EVSE. The electric vehicle can be provided as a motor car, a bus, a van, a truck, a tractor or any other electrically powered vehicle. The EVSE may comprise an outlet port connected to the DC bus, to which a charging cable is connected, for connecting to the electrical vehicle via a charging connector. The charging cable and/or the charging connector are preferably associated charging standards, such as for instance CHAdeMO, CCS, GB, Tesla, etc., and/or are provided according to the standards described above. The EVSE may comprise a plurality of charging cables with respective charging connectors, for example each according to different charging standards.

According to a preferred implementation the Ethernet interface is configured to provide higher-level Ethernet signalling in combination with at least one superposed low-level signalling. Higher-level signalling may comprise Vehicle-to-Grid, V2G, messages that control the status, safety, and conditions of a charge session. Higher level respectively high-level communication respectively signalling may comprise, by exemplary referring to IEC 61851-23, signals such as requested current in constant current charging, requested voltage in constant voltage charging, error messages, measured values of voltage and current provided by the DC EVSE to the EV through digital communication, compatibility of EV and DC EVSE be checked with information exchanged at an initialization phase of communication and charging process, available current changed by the DC EVSE and transmitted to the EV via digital communication, and/or in case of a thermal exchange device or thermal transport device failure, for example failure of cooling pump, jammed cooling hose, stopping operation by the DC EVSE or reducing available current to value for operation without thermal exchange and/or thermal transport, if such a value is given by a cable assembly manufacturer, and transmission to the EV via digital communication by the EVSE. Low-level signalling may comprise, by partially referring to IEC 61851-1 ed3.0, signals such as continuous continuity checking of the protective conductor, verification that the EV is properly connected to the EVSE, energization of power supply to the EV, de-energization of the power supply to the EV, an interlock that can quickly shut down charging as a safety measure in case a latch/lock is malfunctioning and the charging connector is disconnected during charging, maximum allowable current, detection of mating, indicating sleep mode, waking up out of sleep mode, an indication of safe to deliver power, emergency shut-down, indication that the EVSE is ready to supply energy, an indication that the EVSE is not ready to close the switching device and/or an indication that the EVSE is not available for charging, for example needs maintenance. Generally, low-level signalling can be a voltage, a current, a source with a fixed or variable impedance, a duty-cycle, a different load, an a-symmetry of loads, etc. Low-level signalling can be used to supply auxiliary power the EVSE, the EV, an adapter in between, a V2L, vehicle to load, discharge station, a V2H, vehicle to home, charge/discharge station, a V2G, vehicle to grid, charge/discharge station, etc. from the other side.

In another preferred implementation the Ethernet interface includes at least one twisted pair connected to the first and second connections, the twisted pair providing Ethernet communication and superposed basic signalling between the controllers of the electric vehicle supply equipment and the electric vehicle. Twisted pair cabling is a type of wiring in which two conductors of a single circuit are twisted together for the purposes of improving electromagnetic compatibility. Compared to a single conductor or an untwisted balanced pair, a twisted pair reduces electromagnetic radiation from the pair and crosstalk between neighbouring pairs and improves rejection of external electromagnetic interference. For the present application the term twisted pair should be broadly interpreted such that the wires do not mandatorily have to be twisted across their full length or do not need to be not twisted at all. According to a further preferred implementation the Ethernet interface comprises one, two or four twisted-pair cables. As outlined before, with a single twisted-pair cable 1000BASE-T1 or 100BASE-T1 standard can be used. 100BASE-TX requires two twisted-pair cables, whereas 1000BASE-T1, 2.5GBASE-T, 5GBASE-T and 10GBASE-T each require four twisted-pair cables, whereas the latter standards allows a data transmission rate of 2.500 Mbps, 5.000 Mbps respectively 10.000 Mbps.

According to a preferred implementation the basic signalling comprises one or more of a control pilot and a proximity pilot. Control pilot and/or proximity pilot are preferably signalled as per SAE J1772 and/or IEC 61851 standard. In another preferred implementation the Ethernet interface includes a PE contact for basic signalling that is one of a protective earth reference, functional earth reference, reference earth, or unearthed reference. Alternatively, basic signalling can be done by differential voltage, which is advantageous for wiring in high EMI conditions to maintain the signal.

According to a preferred implementation the communications interface comprises first and second transformers at the first and second connections to combine basic signalling communications with Ethernet communications. The transformers are preferably provided as isolation barriers. Ethernet communication requires an isolation barrier, where preferably high frequency transformers are commonly used. Such transformers allow using a centre tap to superimpose the Ethernet communication on the basic signals, analogue to Power-over-Ethernet, PoE, connections. The Ethernet interface is preferably provided as a Power-over-Ethernet, PoE, thereby allowing that the controller of the electric vehicle supply equipment powers the controller of the electric vehicle, or vice versa. In a further preferred implementation, the Ethernet interface comprises an adapter between the electric vehicle supply equipment and the electric vehicle. In another preferred implementation, the Ethernet interface is provided as PoDL, Power over Data Lines, in particular in reference to 100BASE-T1 and 1000Base-T1 standard.

In another preferred implementation the first and second connections each include a PHY chip. PHY, abbreviation for "physical layer", is an electronic circuit, usually implemented as a chip, for implementing physical layer functions of the OSI model. The PHY chip connects a link layer device, often called MAC as an acronym for medium access control, to a physical medium such as an optical fibre or copper cable. A PHY device typically includes both Physical Coding Sublayer, PCS, and Physical Medium Dependent, PMD, layer functionality. An Ethernet PHY is a component that operates at the physical layer of the OSI network model for implementing the Ethernet physical layer portion of, for example, the 1000BASE-T, 100BASE-TX, and 10BASE-T standards. More specifically, the Ethernet PHY is a chip that preferably implements the hardware send and receive function of Ethernet frames, thereby interfacing between the analogue domain of Ethernet's line modulation and the digital domain of link-layer packet signalling. Examples of Ethernet PHYs include Microsemi SimpliPHY and SynchroPHY VSC82xx/84xx/85xx/86xx family, Marvell Alaska 88E1310/88E1310S/88E1318/88E1318S Gigabit Ethernet transceivers and further chips from Intel and ICS. Preferably the PHY chip is provided as a so called green PHY modem.

According to a preferred implementation a cord extends between the first and second connections and provides electrical charging from the electric vehicle supply equipment to the electric vehicle along with Ethernet communications between the controllers. The chord is preferably provided as charging cable having at least one connector for connecting to an outlet respectively inlet of the EV.

In another preferred implementation the Ethernet communications include high level communications transmitted by at least two twisted pairs and basic signalling superposed onto the twisted pairs. For example, in CHAdeMO pilots CP, CP2, CP3 and CS could be used as two pairs, while in CCS one pair could be implemented with the CP and PP lines. CP and PP can physically be implemented with two pairs, while it is also possible to implement CP' and PP' functionality using a single pair using one or several forms of low-level signalling.

The object is further solved by a system comprising:
electric vehicle supply equipment for providing electrical power to an electric vehicle; and
a charging cord that integrates an Ethernet interface and extends between a first connection at the electric vehicle supply equipment and a second connection at a connector configured for connecting to a mating inlet of an electric vehicle to transmit Ethernet communication signals between the first and second connections.

In a preferred implementation the system comprises a controller at the electric vehicle supply equipment and the Ethernet interface transmits Ethernet communication signals and basic or low-level communication signals between the controller and an electric vehicle when connected to the second connection.

The object is even further solved by a method for supplying electrical power to an electric vehicle, the method comprising:
plugging a connector of electric vehicle supply equipment into an inlet of the electric vehicle, wherein a charging cord includes an Ethernet interface between the connector to the electric vehicle supply equipment and the inlet of the electric vehicle;
supplying electrical power from the electric vehicle supply equipment to the electric vehicle through the connector; and
transmitting communications between a controller of the electric vehicle and a controller of the electric vehicle supply equipment via the Ethernet interface while supplying the electrical power.

The connectors, also referred to charging connectors, is preferably attached to the charging cord, also referred to as charging cable. Thus, by plugging the connector into the inlet of the electric vehicle not only electrical power is distributed to the electrical vehicle but also the Ethernet connection is established between the controller of the electric vehicle and the controller of the electric vehicle supply equipment for transmitting communications.

In a preferred implementation of the method transmitting communications includes using a first differential pair for Ethernet communication and basic or low-level signalling from the electric vehicle to the electric vehicle supply equipment and using a second differential pair for Ethernet communication and basic signalling from the electric vehicle supply equipment to the electric vehicle.

In another preferred implementation of the method the first differential pair includes two contacts and is connected to a control pilot and referenced to protective earth, and the second differential pair includes two contacts and is connected to a proximity pilot and referenced to protective earth. In another preferred implementation of the method there is only one differential pair that includes two contacts and is connected to a low-level signalling and referenced to protective earth, PE. The low-level signalling preferably performs the CP and/or PP functionality, and/or other low-level signalling as described before and/or a sub-set of these functionalities.

Further embodiments and advantages of the system and the method are apparent for the person skilled in the art from the interface as described before. Exemplary embodiments of the disclosure include between devices, apparatuses, methods, systems and techniques for an Ethernet over basic interface between EVSE and electric vehicles. Further embodiments, forms, objects, features, advantages, aspects, and benefits of the disclosure shall become apparent from the following description and drawings.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (Band C); or (A, B, and C). Similarly, items listed in the form of "at least one of A, B, or C" can mean (A); (B); (C); (A and B); (A and C); (Band C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The present disclosure relates to devices, apparatuses, methods, systems, and techniques for charging an electric vehicle with electrical power from a power grid or other source that is delivered by electric vehicle supply equipment through a connector. Referring now to FIG. 1, an illustrative electric vehicle charging system 100 is configured to charge an electric vehicle 102 that includes a rechargeable energy storage device 104, such as a battery or other suitable energy storage device, for example. In the illustrative embodiment, the electric vehicle 102 is embodied as, or otherwise includes, any vehicle powered partially or completely by electrical power, such as a vehicle driven by an electric motor, drive unit, or propulsion system, for example. In another example, the illustrative electric vehicle 102 may be embodied as, or otherwise include, a hybrid electric vehicle that includes a non-electrically powered drive unit, e.g., an internal combustion engine, in addition to one or more electrically-powered motors, drive units, or propulsion systems. The term vehicle should be broadly construed to include trucks, cars, busses, construction equipment, boats, airplanes, hover craft, etc. so long as a battery or other energy storage device is provided that requires charging.

The illustrative system 100 includes electric vehicle supply equipment, EVSE, 106 that receives power from the power grid or other suitable power source. EVSE 106 includes a charger 108 which includes a converter that is configured to convert alternating current, AC, power to direct current, DC, power. A charger 108 that is an AC charger is also contemplated. It should be appreciated that the charger 108 may be remotely located from the vehicle 102 or provided on e.g. mounted to the vehicle 102. In any case, the vehicle 102 includes an inlet or socket 110 that is configured to mate with a first connector 120 of the system 100 at a first connection 123 so that electrical power from the power source may be used to charge the battery 104 through the EVSE 106. Although the connector 120 is configured to be plugged into the inlet 110, it should be appreciated that the connector 120 may be mated with the inlet 110 in another suitable fashion. The connector 120 is illustratively coupled with the EVSE 106 by a cord 114 or other suitable connection arrangement. Cord 114 is coupled to EVSE 106 with a second connector 121 at a second connection 125 at an end of cord 114 opposite the first connection. The second connector 121 need not be the same as connector 120, and can be a permanent type connection.

It should be appreciated that the illustrative EVSE 106 may be characterized or referred to as supply equipment, a vehicle charger, charging equipment, a charging station, a charger, or the like. Moreover, it should be appreciated that the EVSE 106 may be provided in any one of a number of configurations. For example, the EVSE 106 may be provided as a wall mounted charger in a garage or building where vehicles are parked, on a pedestal or kiosk at an outdoor and/or curb side location, with one or more portable charging devices, or at other locations.

Figure 2:
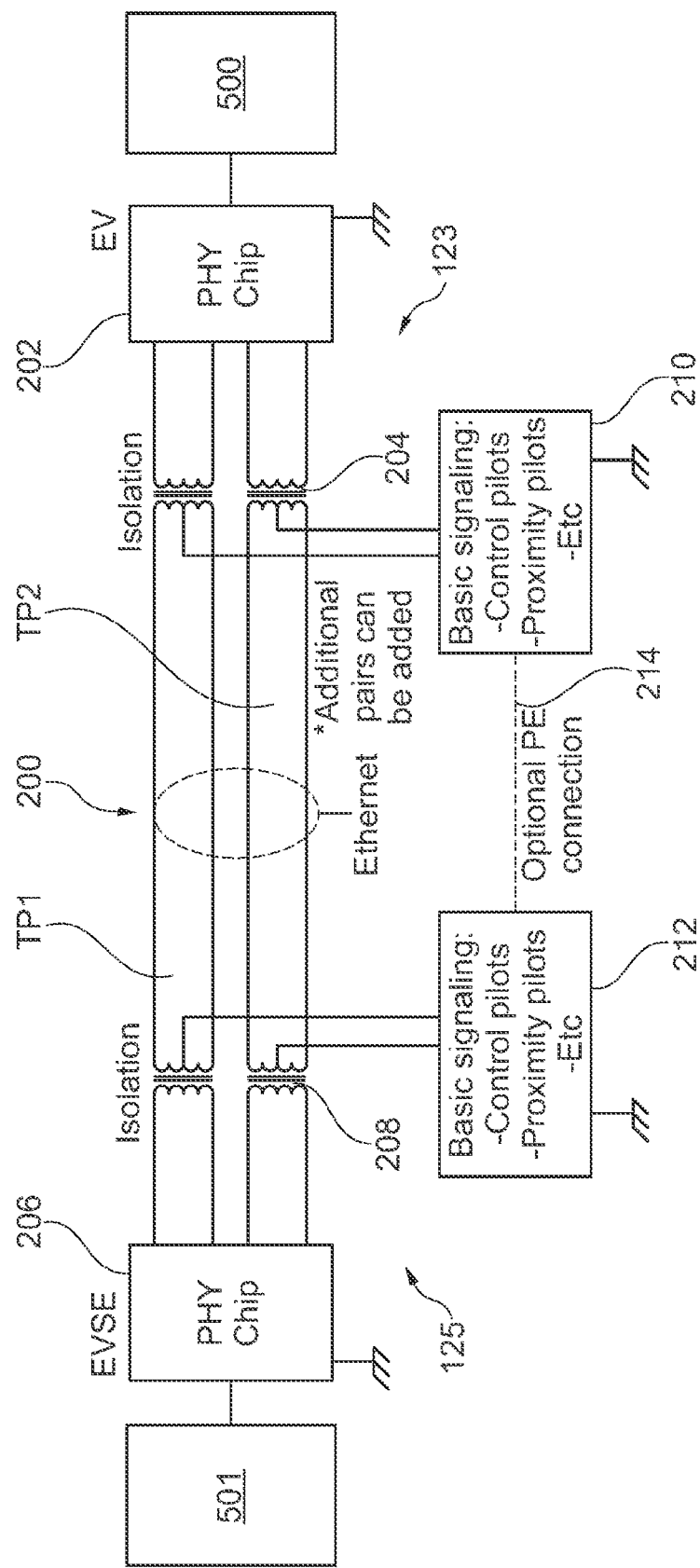
FIG. 2 is a schematic of an example Ethernet connection for the electric vehicle charging system of FIG. 1.

As shown in FIG. 2, the cord 114 includes a charge cable and an Ethernet interface 200 that connects first connection 123 and second connection 125 to transmit high level communication, HLC, signals between the EV controller 500 and the EVSE controller 502. The Ethernet interface 200 includes twisted pairs TP1, TP2 for Ethernet communication. The HLC signals may be transmitted by Ethernet communication protocol, for example according to IEEE 802.3, or other similar protocols via TP1 and TP2. Therefore, the additional wiring needed to employ CAN bus or PLC communication is not needed with Ethernet interface 200. The HLC signals can include vehicle to-grid messages that control status, safety and conditions of the charge session, for example. The Ethernet interface 200 also includes basic signalling communications that are superposed on TP1 and TP2 to transmit basic, or low-level signalling, such as those that indicate charging conditions, the state of the charge session, presence of the vehicle, presence of the connection, safety conditions, etc. Examples of such basic or low-level signals include Control Pilot, CP, Position Pilot, PP, CP, CP2, CP3, and CA signals, among others.

For example the Ethernet interface 200 may be provided in connection with cords, cables, cable connections, and/or conductors configured to include aspects of one or more of the JI 772 standard, the CHAdeMO standard, SAE Combo CCS standard, Tesla HPWC or supercharger standards, or other configurations or standards as would occur to one of skill in the art. It is further contemplated that the Ethernet interface 200 may be implemented at least in part via existing connections, cables and conductors of certain such configurations or standards where available or by augmentation of or addition thereto to provide a signal transmission path and structure in accordance with the present disclosure. Ethernet interface 200 can include one or more twisted pairs of wires TP1, TP2 and signal polarity capable of withstanding electromagnetic interference. Different numbers of pairs can be used to increase the data rate, communication with different functionality, etc.

First connection 123 includes a first PHY chip 202 associated with vehicle controller 500 and a first isolation barrier 204. Second connection 125 includes a second PHY chip 206 associated with an EVSE controller 501 and a second isolation barrier 208. Isolation barriers may include high frequency transformers typically employed in Ethernet. PHY chips 202 may be separate chips or may be implanted in or integrated into another controller, processor, or other integrated circuitry. The ends of Ethernet interface 200 can each include a centre tap connection of the transformers at isolation barriers 204, 208 with the respective basic signal contacts 210, 212, respectively, where basic signalling is superposed on the Ethernet communications. The basic signal contacts 210, 212 can include control pins, proximity pins, etc. as may be found in systems described in IEC 61851-23.

In one embodiment, the basic signalling interface is superposed onto the differential twisted pairs TP1, TP2 of the Ethernet interface 200 thereby having an arrangement in which only four contacts are needed to implement, for example together with PE, both point-to-point communication for Ethernet communication and basic signalling. For instance, the connection between the EV 102 and EVSE 106 may include:

DC+/− connections for charging power transfer;
protective earth, PE, connection for safety and as a reference for basic signalling;
1 differential, twisted, pair, 2 contacts, for Ethernet communication from EV to EVSE+basic signalling: Control Pilot, CP, referenced to PE;
1 differential, twisted, pair, 2 contacts, for Ethernet communication from EVSE to EV+basic signalling: Proximity Pilot, PP, referenced to PE.

The physical implementation of the contacts in the connector 120 can be just 4 pins, or an RJ45 commonly used in Ethernet interfaces, or any other contact arrangement, but is part of the vehicle connector/vehicle socket 120/110. The Ethernet interface 200 is a single cable such as cord 114, with a single connector 120 that plugs into a single socket or inlet 110 on the EV 102. Additional basic signalling can be accommodated with an additional wire or twisted pair(s), such as for CHAdeMO/System A basic signalling requirements and GB/System B basic signalling requirements. In another embodiment, the Ethernet and basic signal wiring are provided next to each other inside of the charge connector 120.

For example, an implementation of Ethernet interface 200 including two twisted pairs, 4 contact, may be utilized to provide superposed Ethernet and low level signalling in accordance with CHAdeMO or System A type standard, which include low level signals CP, CP2, CP3, and CA Alternatively, a single twisted pair, two contacts, could be utilized to provide Ethernet and part of the low level signalling of the standard with additional low level signalling being provided via other conductors and corresponding contacts. In SAE Combo CCS standard or System C standard, each pair could implement a basic interface function. For example, the control pilot, CP, could be one Ethernet pair, and the proximity pilot, PP, could be another internet pair, and the protective earth, PE, reference could serve as a grounded reference. The PE reference, or functional earth, reference earth or unearthed reference, connection 214 can be provided in certain embodiments as a reference for the basic interface. Differential voltage could also be employed for basic signalling, which may be more appropriate for wiring in high electromagnetic interference conditions.

Figure 3:
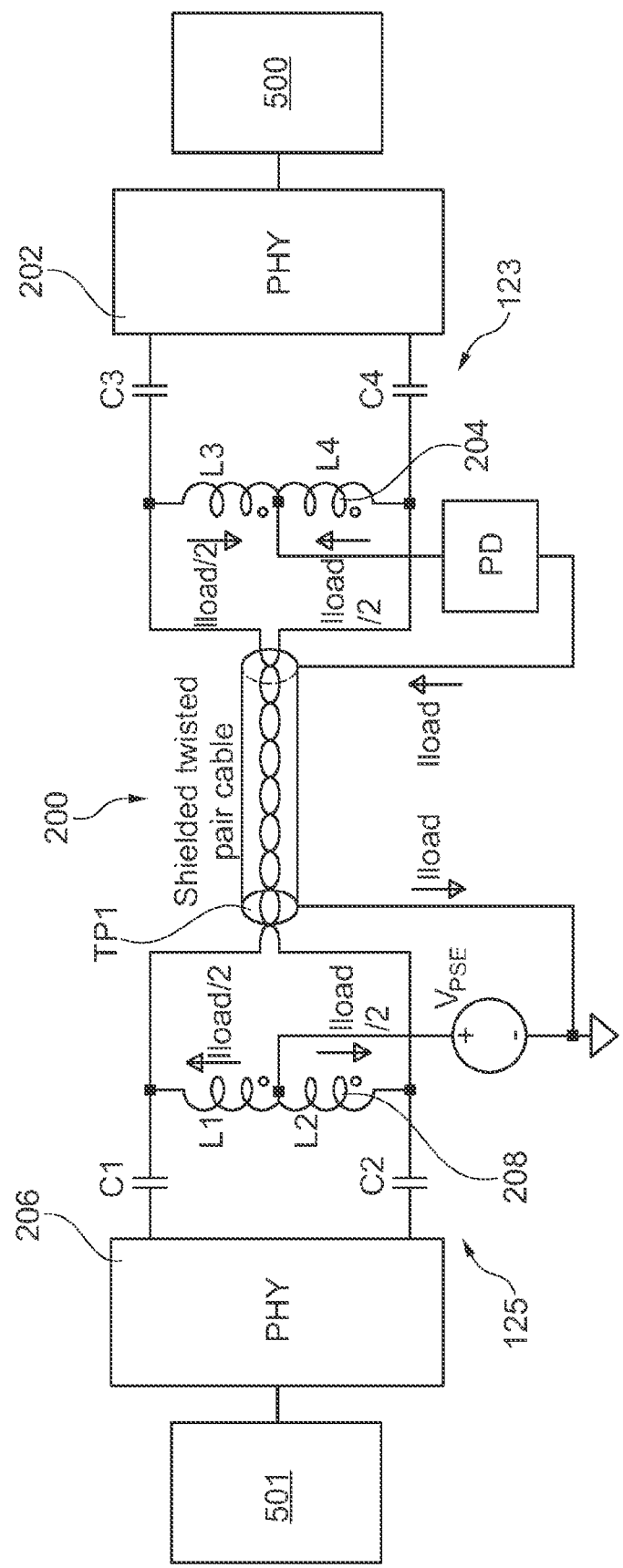
FIG. 3 is a schematic of a further example Ethernet connection for the electric vehicle charging system of FIG. 1.

Communication over Ethernet interface 200 may be established during, operation of the electric vehicle charging system 100. In the communication system 200, an EV controller 500 and EVSE controller 501, described in detail below with reference to FIG. 3, are communicatively coupled to multiple components of the system 100, such as the EVSE 106 and the vehicle 102, for example. Additionally, the controller 500 and controller 501 are communicatively coupled to one another view Ethernet cable 200.

FIG. 3 is a schematic of a further example Ethernet connection for the EVSE 106 of FIG. 1 as circuit diagram, comprising a single shielded twisted pair cable TP1 for communications with the Ethernet interface 200.

Figure 4:
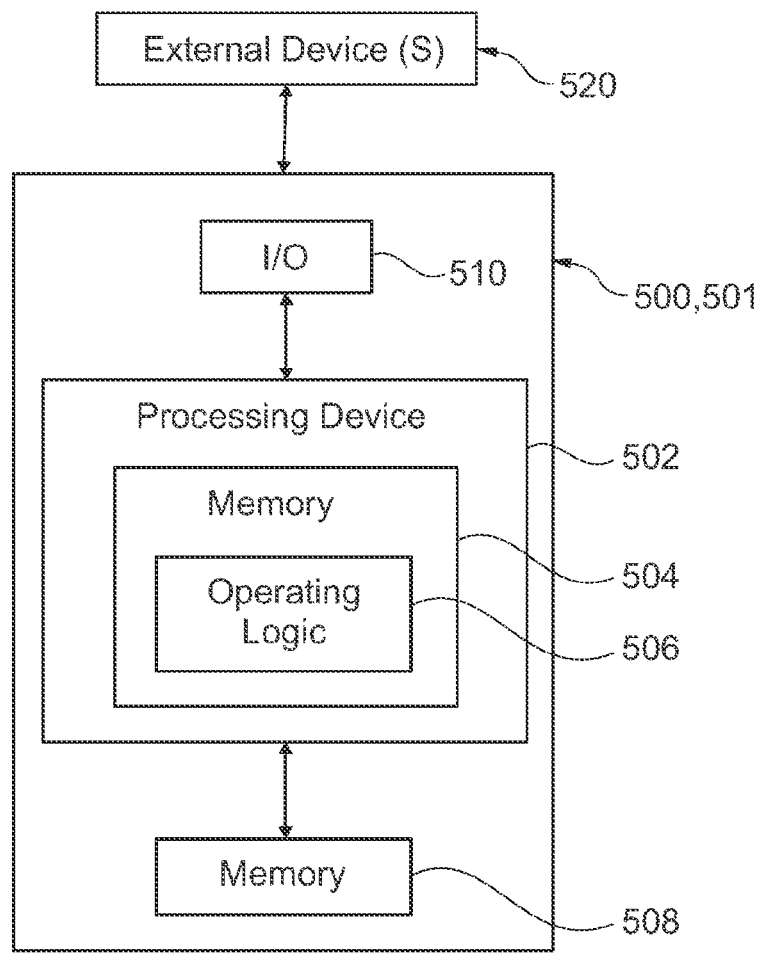
FIG. 4 is a schematic of an example controller apparatus for use with the electric vehicle charging system of FIG. 1.

Referring now to FIG. 4, the illustrative controller 500, 501 may be embodied as, or otherwise include, a device or collection of devices configured to control a supply of electrical power to the vehicle 102 through the EVSE 106 in use of the system 100. In the illustrative embodiment, the controller 500, 501 includes a processing device or processor 502, memory 508 that is communicatively coupled to the processor 502, and an input/output device 510 that is communicatively coupled to the processor 502. Furthermore, in the illustrative embodiment, the controller 500 is communicatively coupled to one or more external devices 520. The one or more external devices 520 may be embodied as, or otherwise include, control devices included in the EVSE 106/charger 108 and/or the vehicle 102, for example.

The processor 502 may be embodied as, or otherwise include, any type of processor, controller, or other compute circuit capable of performing various tasks such as computer functions and/or controlling the functions of the system 100. For example, the processor 502 may be embodied as a single or multi-core processor(s), a microcontroller, or other processor or processing/controlling circuit. In some embodiments, the processor 502 may be embodied as, include, or be coupled to an FPGA, an application specific integrated circuit, ASIC, reconfigurable hardware or hardware circuitry, or other specialized hardware to facilitate performance of the functions described herein. Additionally, in some embodiments, the processor 502 may be embodied as, or otherwise include, an Ethernet switch, a high-power processor, an accelerator co-processor, or a storage controller. In some embodiments still, the processor 502 may include more than one processor, controller, or compute circuit.

In the illustrative embodiment, the processor 502 may include memory 504. The memory 504 may be embodied as any type of volatile (e.g., dynamic random-access memory (DRAM), etc.) or non-volatile memory capable of storing data (e.g., operating logic 506 defined by programming instructions such as software or firmware or by hardwired logic or other hardware) therein. Volatile memory may be embodied as a storage medium that requires power to maintain the state of data stored by the medium. Non-limiting examples of volatile memory may include various types of random-access memory (RAM), such as dynamic random-access memory (DRAM) or static random-access memory (SRAM). One particular type of DRAM that may be used in a memory module is synchronous dynamic random-access memory (SDRAM). In particular embodiments, DRAM of a memory component may comply with a standard promulgated by JED EC, such as JESD79F for DDR SD RAM, JESD79-2F for DDR2 SD RAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org).

Such standards (and similar standards) may be referred to as DDR-based standards and communication interfaces of the storage devices that implement such standards may be referred to as DDR-based interfaces.

In some embodiments, the memory 504 may be embodied as a block addressable memory, such as those based on NAND or NOR technologies. The memory 504 may also include future generation non-volatile devices, such as a three-dimensional cross point memory device, or other byte addressable write-in-place non-volatile memory devices. In some embodiments, the memory 504 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunnelling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D cross point may comprise a transistor-less stackable cross point architecture in which memory cells sit at the intersection of word lines and bit lines and are individually addressable and in which bit storage is based on a change in bulk resistance.

Memory 508 may be substantially similar and/or identical to the memory 504. However, in some embodiments, the memory 504 may be internal to (e.g., incorporated into) the processor 502 whereas the memory 508 may be external to the processor 502. Of course, it should be appreciated that in some embodiments, one of the memory 504 and the memory 508 may be omitted from the controller 500.

The illustrative input/output device 510 is configured to enable the controller 500 to communicate with other local controllers (e.g., control devices included in the EVSE 106/charger 108, and/or the vehicle 102) or a central controller. The input/output device 510 may include a PHY chip, network adapter, network credential, interface, or a port (e.g., a USB port, serial port, parallel port, an analogue port, a digital port, VGA, DVI, HDMI, FireWire, CAT 5, Ethernet, fibre, or any other type of port or interface), to name but a few examples. The input/output device 510 may include more than one of these adapters, credentials, or ports, such as a first port for receiving data and a second port for transmitting data, for example.

The memory 504 and/or the memory 508 may have instructions stored therein that are executable by the processor 502 to cause the processor 502 to evaluate one or more operating conditions, such as during electrical charging operations. Based on that evaluation, the instructions stored in the memory 504 and/or the memory 508 may be executable by the processor 502 to cause the processor 502 to perform one or more operations.

It is contemplated that the various aspects, features, processes, and operations from the various embodiments may be used in any of the other embodiments unless expressly stated to the contrary. Certain operations illustrated in the Figures may be implemented by a computer executing a computer program product on a non-transient, computer-readable storage medium, where the computer program product includes instructions causing the computer to execute one or more of the operations, or to issue commands to other devices to execute one or more operations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST 100 system
102 electric vehicle
104 rechargeable energy storage device
106 electric vehicle supply equipment, EVSE
108 charger
110 inlet or socket
114 cord
120 first connector
121 second connector
123 first connection
125 second connection
200 Ethernet interface
202 first PHY chip
206 second PHY chip
204 isolation barrier
208 isolation barrier
210 signal contact
212 signal contact
214 connection
500 EV controller
501 EVSE controller
502 processor
504 memory
506 operating logic
508 memory
510 input/output device
520 external device
TP1 twisted pair
TP2 twisted pair

What is claimed is:

1. A communications interface between electric vehicle supply equipment and an electric vehicle, the communications interface comprising:
a first connection configured to connect to a controller of the electric vehicle supply equipment;
a second connection configured to connect to a controller of the electric vehicle; and
an Ethernet interface coupling the first and second connections for communication between the controller of the electric vehicle supply equipment and the controller of the electric vehicle,
wherein the Ethernet interface is configured to provide higher-level Ethernet signaling in combination with at least one superposed low-level signaling.

2. The communications interface of claim 1, wherein the Ethernet interface includes at least one twisted pair connected to the first and second connections, the twisted pair providing Ethernet communication and superposed basic signalling between the controllers of the electric vehicle supply equipment and the electric vehicle.

3. The communications interface of claim 2, wherein the basic signalling comprises one or more of a control pilot and a proximity pilot.

4. The communications interface of claim 1, wherein the Ethernet interface includes a PE contact for basic signaling, the PE contact comprising one of a protective earth reference, functional earth reference, reference earth, or unearthed reference.

5. The communications interface of claim 1, further comprising:
first and second transformers at the first and second connections configured to combine basic signalling communications with Ethernet communications.

6. The communications interface of claim 1, wherein the first and second connections each include a PHY chip.

7. The communications interface of claim 1, further comprising:
a cord that extends between the first and second connections and is configured to provide electrical charging from the electric vehicle supply equipment to the electric vehicle along with Ethernet communications between the controllers.

8. The communications interface of claim 7, wherein the Ethernet communications include high level communications transmitted by at least two twisted pairs and basic signalling superposed onto the twisted pairs.

9. A system, comprising:
electric vehicle supply equipment configured to provide electrical power to an electric vehicle;
a charging cord comprising an Ethernet interface and that extends between a first connection at the electric vehicle supply equipment and a second connection at a connector configured to connect to a mating inlet of the electric vehicle to transmit Ethernet communication signals between the first and second connections; and
a controller at the electric vehicle supply equipment,
wherein the Ethernet interface is configured to transmit Ethernet communication signals in combination with at least one superposed basic or low level communication signal between the controller and the electric vehicle when connected to the second connection.

10. A method for supplying electrical power to an electric vehicle, the method comprising:
plugging a connector of electric vehicle supply equipment into an inlet of the electric vehicle so as to provide a charging cord that includes an Ethernet interface between the connector to the electric vehicle supply equipment and the inlet, wherein the Ethernet interface is configured to provide higher-level Ethernet signaling in combination with at least one superposed low-level signaling;
supplying electrical power from the electric vehicle supply equipment to the electric vehicle through the connector; and
transmitting communications between a controller of the electric vehicle and a controller of the electric vehicle supply equipment via the Ethernet interface while supplying the electrical power.

11. The method of claim 10, wherein transmitting communications comprises using a first differential pair for Ethernet communication and basic or low level signalling from the electric vehicle to the electric vehicle supply equipment and using a second differential pair for Ethernet communication and basic signalling from the electric vehicle supply equipment to the electric vehicle.

12. The method of claim 11, wherein the first differential pair includes two contacts and is connected to a control pilot and referenced to protective earth, and the second differential pair includes two contacts and is connected to a proximity pilot and referenced to protective earth.

* * * * *